United States Patent [19]

Wesely

[11] 4,083,921
[45] Apr. 11, 1978

[54] PURIFYING MOLYBDENUM FLOTATION CONCENTRATES

[75] Inventor: Rolf Jurgen Wesely, Salt Lake County, Utah

[73] Assignee: Kennecott Copper Corporation, New York, N.Y.

[21] Appl. No.: 756,491

[22] Filed: Jan. 3, 1977

[51] Int. Cl.$^2$ .................... C01G 39/00; C01G 21/16
[52] U.S. Cl. ........................................ 423/55; 423/53; 423/38; 423/39; 423/94; 423/98; 423/494
[58] Field of Search .................. 423/53, 56, 58, 38, 423/39, 55, 94, 98; 75/111, 114

[56] References Cited

U.S. PATENT DOCUMENTS

| 3,117,860 | 1/1964 | Bjerkerud et al. | 423/53 |
| 3,674,424 | 7/1972 | Stanley et al. | 423/53 |
| 3,694,147 | 9/1972 | Drobnick et al. | 423/53 |
| 3,854,930 | 12/1974 | Kento | 423/56 |
| 3,911,076 | 10/1975 | Probert et al. | 423/53 |

FOREIGN PATENT DOCUMENTS

| 1,339,201 | 11/1973 | United Kingdom | 423/53 |
| 1,339,202 | 11/1973 | United Kingdom | 423/53 |

Primary Examiner—Herbert T. Carter
Attorney, Agent, or Firm—Mallinckrodt & Mallinckrodt

[57] ABSTRACT

Copper, iron, and lead impurities are removed from molybdenum flotation concentrates by mixing the feed concentrates with a nonvolatile chloride salt, heating the mixture to a temperature of from about 200° to 350° C for a time sufficient to activate the lead impurities in the concentrates so that they can be leached therefrom during the subsequent leach step, and leaching copper, iron, and lead impurities from the heat-treated concentrates with a mildly oxidizing leach solution containing chloride ions and having a pH of no more than 4. Preferably, the mixing of the chloride salt and the feed concentrates is achieved by thoroughly mixing an aqueous solution of the salt with the feed concentrates. It is advantageous to use an aqueous ferric chloride solution to leach the heat-treated concentrates inasmuch as the lead values leached from the concentrates are readily crystallized from the pregnant leach solution and the resulting spent solution can be recycled without further treatment to be mixed with the feed concentrates, or it can be treated to oxidize ferrous values therein to ferric and then recycled for repeated use as regenerated leach solution.

10 Claims, 1 Drawing Figure

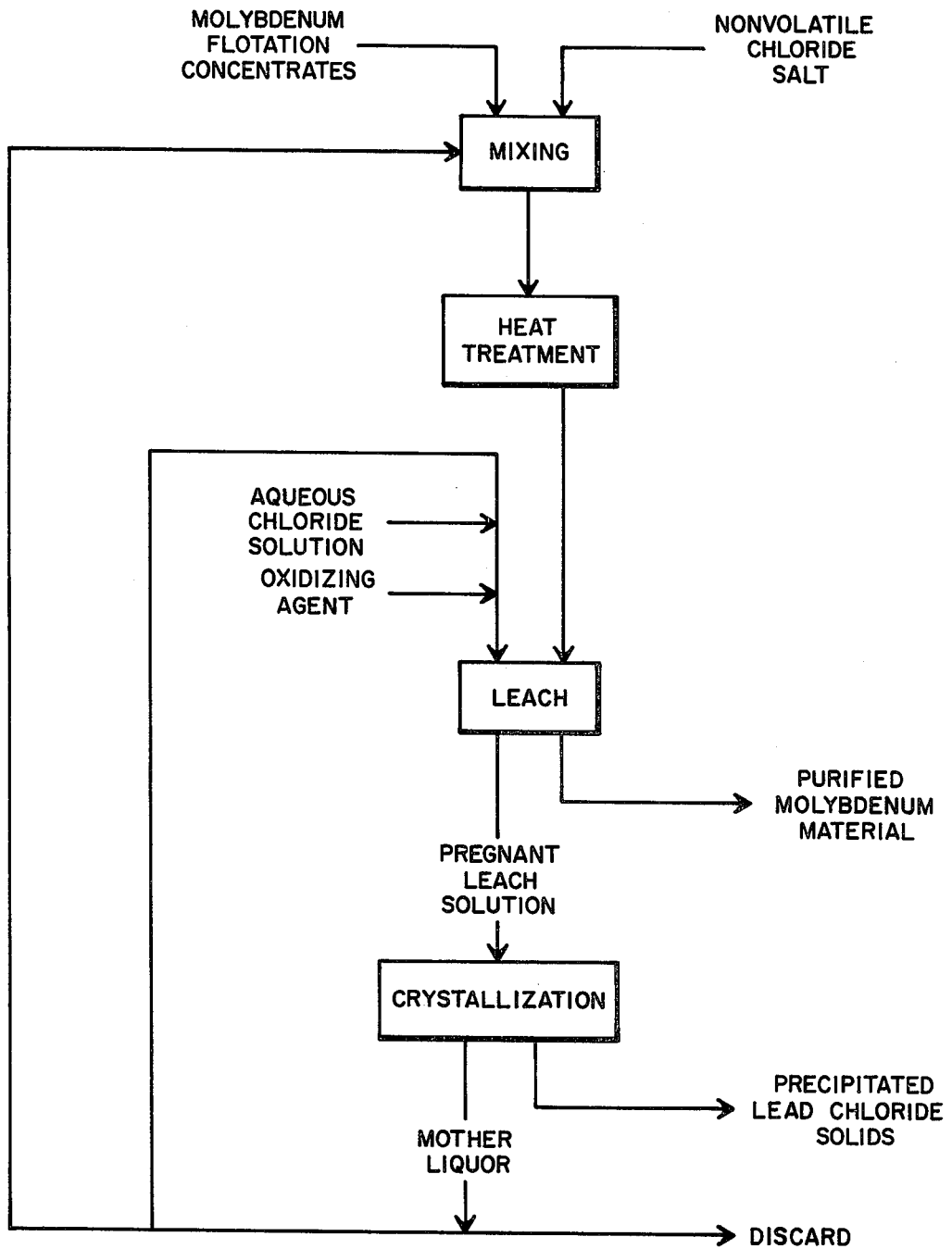

PURIFYING MOLYBDENUM FLOTATION CONCENTRATES

BACKGROUND OF THE INVENTION

1. Field

This invention relates to processes for removing impurities, especially lead, copper, and iron from molybdenite flotation concentrates.

2. State of the Art

Copper and molybdenum minerals are frequently found together in ore bodies, and are customarily removed from these ore bodies and separated from each other by differential froth flotation. The molybdenite concentrates so obtained contain copper, iron, and lead impurities, which must be removed if the molybdenite is to meet market standards for a high purity product.

Several leach systems have been disclosed in the prior art for removing impurities from molybdenite concentrates. In accordance with U.S. Pat. No. 3,117,860, lead and copper impurities are removed from molybdenum flotation concentrates by roasting the concentrates in the presence of gaseous chlorine at a temperature not above 400° C, preferably between 150° and 300° C, to form soluble chlorides of the copper and lead impurities, which are subsequently leached from the roasted concentrates with water. As demonstrated in Example 4 of that patent, a product containing 0.15% lead could be produced from a feed material containing 0.4% lead; however, to meet market standards for a high purity product, the molybdenite should contain no more than 0.05% lead.

Objectives: The principal objective of this invention was to develop an efficient process capable of removing lead impurities from molybdenum flotation concentrates to produce a product which would meet market requirements for a high purity molybdenite containing no more than 0.05% lead. In addition, a process was sought which would also be effective in removing copper and iron from the molybdenite and which would not result in high molybdenite losses.

SUMMARY OF THE INVENTION

In accordance with the invention, the foregoing objectives are achieved by roasting the molybdenum flotation concentrates with a non-volatile chloride salt to activate the surface of the lead mineral particles in the concentrates so that the lead content of the concentrates can be reduced to no more than 0.05% when the roasted concentrates are leached with a mildly oxidizing leach solution containing chloride ions and having a pH of no more than 4.

The feed concentrates are thoroughly mixed with a nonvolatile chloride salt, preferably an aqueous solution of the salt, and the mixture is heated to a temperature of from about 200° to 350° C for a time sufficient to activate the lead impurities in the concentrates. The lead impurities are not converted to chlorides. Instead, the surfaces of the particles of the lead impurities are activated such that the lead impurities can be fully dissolved in the subsequent leach step.

In the leach step, the activated, roasted concentrates are leached with an aqueous leach solution containing chloride ions and having a pH of no more than 4. The oxidation potential of the leach solution, as measured between platinum and saturated calomel electrodes, is maintained within the range of about 200 and 800 millivolts. By controlling the oxidation potential of the leach solution, the molybdenum values in the concentrates are essentially unaffected by the leach solution and, therefore, remain intact in the leached concentrates. Lead, copper, and iron impurities are readily removed from the concentrates by the leach solution, and the resulting, purified concentrates meet market specifications for a high purity product.

The pregnant leach solution resulting from the use of a ferric chloride leach solution is advantageously subjected to a purification treatment wherein the lead values which were leached from the feed concentrates are removed to produce a barren solution which is suitable for recycle to either be mixed with additional feed concentrates or reused as the leach solution in the leaching of the roasted concentrates. Recycling of the barren solution is advantageous in minimizing the problems of disposing of waste effluents, and the recovery of usable reagents in the recycled solution results in the maximum efficiency of the reagents being used.

THE DRAWING

Procedures typical of the process of this invention and representing the best mode presently contemplated of carrying out the process in actual practice are illustrated in the accompanying drawing in which the single FIGURE is a flowsheet of the process.

DETAILED DESCRIPTION OF THE ILLUSTRATED PROCEDURE

As illustrated in the accompanying flowsheet, molybdenum flotation concentrates are thoroughly mixed with a nonvolatile chloride salt, such as ferric chloride, sodium chloride, calcium chloride, magnesium chloride, or mixtures thereof.

The chloride salt is preferably dissolved in an aqueous solution, with the aqueous solution being thoroughly mixed with the feed concentrates. The concentration of the salt in such solution is not per se critical; however, the more concentrated the solution, the less heat will be required to remove water from the damp concentrates in the subsequent heat treatment or roasting step. The chloride salt, either as a solid or a solution, can be added directly to the concentrates during the mixing. As will be more fully described hereinafter, a mother liquor is produced in subsequent steps of the process which contains dissolved chloride salts, and this solution can be recycled to the mixing step to supply all or part of the chloride salt to be mixed with the feed concentrates.

The amount of chloride salt which is mixed with the feed concentrates depends upon the particular chloride salt which is being used as well as the amount of lead contained in the concentrates. Generally, from about 1 to 4 parts by weight of the chloride salt is used per part of lead contained in the concentrate. Within that range, optimum amounts of a particular chloride salt are readily determined by routine laboratory tests.

The mixture of feed concentrates and chloride salt is heated to a temperature of between about 200° to 350° C for about one hour or longer. The object of the heat treatment step is to activate the particles of lead impurities in the feed concentrate so that they are amenable to being leached therefrom in a subsequent leaching operation. The reactions occuring during the heat treatment are not completely known. It is postulated that the chloride salt removes a protective surface film from the particles of lead impurities; however, the invention is not to be limited to such a theory.

Good temperature control during the heat treatment is necessary to prevent overheating of the concentrates. If the temperature is allowed to go above about 350° C, the molybdenite in the concentrates may ignite, especially if air is present. Ignition of the molybdenite in the concentrates is detrimental in that it converts the molybdenite into molybdenum values which are also amenable to being leached from the concentrates during the subsequent leaching operation. Free access of air to the concentrates during the heat treatment should also be restricted as much as is feasibly possible.

The heat-treated concentrates are intimately contacted with a solution which leaches lead, copper, and iron impurities from the concentrates while leaving essentially all the molybdenum intact. The leach solution comprises an aqueous solution having a pH of no more than 4 and containing at least about 50 grams per liter chloride ions. In addition, the leach solution should be mildly oxidizing, i.e., the oxidation potential of the solution as measured between platinum and saturated calomel electrodes should be between about 200 and 800 millivolts, preferably between about 400 and 600 millivolts.

The leach solution may comprise aqueous solutions of ferric chloride, magnesium chloride, sodium chloride, calcium chloride, and mixtures of ammonium chloride and hydrochloric acid.

The chloride ion concentration in the leach solution should be at least about 50 grams per liter and can be as high as the solubility of the chloride being used will permit. Preferably, the leach solution contains from about 50 to 250 grams per liter of chloride ions. The leach solution is heated to a temperature up to about 70° to 95° C, and the contact between the leach solution and the heat-treated concentrates is maintained at that temperature for at least about one hour. Preferably, the leach solution and the concentrates are formed into a slurry, and the slurry is maintained under continuous agitation during the leach step.

The leached molybdenum concentrates are separated from the pregnant leach solution by filtration with washing or by decantation followed by filtration. The slurry being filtered must be maintained at a temperature above about 70° C, preferably at about 80° C, to prevent unwanted precipitation of lead chloride from the leach solution during the filtration.

The pregnant leach solution which is separated from the leached molybdenum concentrates is cooled to a temperature of about 50° C or less and lead chloride is removed therefrom by crystallization. The mother liquor from the crystallization is amenable to being recycled and reused as the leach solution. If necessary, the mother liquor can be brought up to required chloride ion concentration and proper oxidation potential by the addition of the appropriate chloride salt and oxidizing agent. The mother liquor coming from the crystallization step contains iron and copper values which were extracted from the molybdenum concentrates. To prevent an undue accumulation of iron and copper in the leach solution, a small bleed stream of the mother liquor is withdrawn from the system and either discarded or further treated to recover the copper values contained therein.

The use of a ferric chloride leach solution is advantageous in that the mother liquor obtained after the lead chloride has been removed from the pregnant leach contains ferrous chloride which is readily oxidized to ferric chloride by using chlorine as the oxidizing agent employed to bring the solution to the proper oxidizing potential for use in the leaching step. The recycled mother liquor can be treated prior to its being reused as leach solution, or the chlorine can be added to the leach vessel along with heat treated concentrates and recycled mother liquor, whereby the ferrous values in the recycled solution are oxidized to ferric values concurrently with the leaching operation. As shown in the drawing, a portion of the recycled mother liquor can be mixed directly with fresh feed concentrates for use in the heat treatment, with the remaining portion being reused in the leach step. If there is insufficient chloride in the recycled mother liquor, an aqueous chloride solution may be added to the portion of the mother liquor which is recycled to the leach step or to the leach vessel so as to establish the proper chloride ion concentration therein. That portion of the recycled mother liquor which is to be mixed with fresh molybdenum concentrates for use in the heat treatment need not be subjected to chlorination prior to its being mixed with the concentrates inasmuch as it contains ferrous chloride, and ferrous chloride is as effective in activating the lead impurities in the feed concentrates as is ferric chloride.

In those instances wherein the mother liquor is recycled for reuse in the heat treatment and leach, that portion of it which is mixed with the fresh, feed concentrates in many cases will contain sufficient chloride to satisfy the chloride requirements in the heat treatment step, and the separate addition of a nonvolatile salt, as shown in the drawing, is unnecessary. If the recycled solution to be mixed with the fresh, feed concentrates is deficient in the necessary amount of chloride, the deficiency is made up by adding a nonvolatile chloride salt directly to the mixing vessel or to the recycled solution prior to its introduction into the mixing vessel.

The process of this invention produces a purified molybdenum product containing 0.05% or less lead from feed concentrates containing 0.4% lead or more. In addition, copper and iron impurities are also effectively removed from the feed concentrates; and the purified molybdenum product which is obtained meets market specifications for high purity.

Whereas this invention is here illustrated and described with specific reference to an embodiment thereof presently contemplated as the best mode of carrying out the invention in actual practice, it is to be understood that various changes may be made in adapting the invention to different embodiments without departing from the broader inventive concepts disclosed herein and comprehended by the claims that follow.

I claim:

1. A process for removing copper, iron, and lead impurities from molybdenum flotation concentrates, comprising mixing a nonvolatile chloride salt with the concentrates in a ratio of about 1 to 4 parts by weight of the chloride salt to 1 part of lead in the concentrates; heating the mixture of concentrates and chloride salt to a temperature of from about 200° to 350° C, for a time sufficient to activate the lead impurities in the concentrates so that they are amenable to being leached therefrom; leaching lead, copper, and iron impurities from the concentrates by contacting the heat-treated concentrates with a mildly oxidizing leach solution having a pH of no more than 4 and at a temperature of between about 70° and 95° C, said leach solution containing at least about 50 grams per liter of chloride ions and having an oxidation potential of between about 200 and 800 millivolts as measured between platinum and saturated calomel electrodes; and separating the molybdenum-containing concentrates from the pregnant leach solution, while maintaining the temperature of the pregnant leach solution above about 70° C until it has been separated from the molybdenum-containing concentrates to prevent precipitation of lead chloride from the pregnant leach solution during said separation.

2. A process in accordance with claim 1, wherein the mixture of concentrates and chloride salt is heated to a temperature of about 250° to 300° C and held at that temperature for a period of about one hour.

3. A process in accordance with claim 1, wherein the chloride salt is selected from the group consisting of magnesium chloride, ferric chloride, sodium chloride, and calcium chloride.

4. A process in accordance with claim 1, wherein the leaching of the heat treated concentrates is accomplished by forming a slurry of the concentrates and the leach solution, and said slurry is agitated continuously for at least about 1 hour.

5. A process in accordance with claim 1, wherein the chloride salt which is to be mixed with the feed concentrates is first dissolved in an aqueous solution, and the solution is then thoroughly mixed with the feed concentrates.

6. A process in accordance with claim 1, wherein the mildly oxidizing leach solution contains from about 50 to 250 grams per liter of chloride ions.

7. A process in accordance with claim 6, wherein the leach solution comprises a member selected from the group consisting of ferric chloride, magnesium chloride, sodium chloride, calcium chloride, and mixtures of ammonium chloride and hydrochloric acid.

8. A process in accordance with claim 1, wherein the oxidation potential of the leach solution as measured between platinum and saturated calomel electrodes is between about 400 and 600 millivolts.

9. A process in accordance with claim 1, wherein the leach solution comprises ferric chloride; the pregnant leach solution which is separated from the molybdenum-containing concentrates is cooled to less than 50° C to precipitate lead chloride therefrom; the precipitated lead chloride is removed from the mother liquor; at least a portion of the mother liquor is recycled for reuse as leach solution; and chlorine is added to said portion of the mother liquor to oxidize ferrous chloride therein to ferric chloride and to bring the oxidation potential thereof to the proper oxidation potential for use in the leaching step.

10. A process in accordance with claim 9, wherein the remaining portion of the mother liquor is mixed with feed concentrates.

* * * * *